United States Patent

Long et al.

[11] 3,899,399
[45] Aug. 12, 1975

[54] RECOVERY OF HIGH PURITY VINYL CHLORIDE BY DISTILLATION

[75] Inventors: Raymond H. Long, Morristown; Harold Unger, Fort Lee, both of N.J.

[73] Assignee: The Lummus Company, Bloomfield, N.J.

[22] Filed: Jan. 21, 1974

[21] Appl. No.: 435,100

[52] U.S. Cl. ............... 203/77; 203/81; 260/652 P; 260/654 S
[51] Int. Cl.² .................. B01D 3/00; B01D 3/10
[58] Field of Search ......... 260/656 R, 654 S, 652 P; 203/74, 77, 81

[56] References Cited
UNITED STATES PATENTS

| | | | |
|---|---|---|---|
| 2,724,006 | 11/1955 | Krekeler | 260/656 R |
| 2,938,837 | 5/1960 | Meyer et al. | 203/77 |
| 3,409,511 | 11/1968 | Rechmeier et al. | 260/656 R |
| 3,468,967 | 9/1969 | Wall et al. | 260/656 R |
| 3,484,493 | 12/1969 | Krekeler et al. | 260/656 R |
| 3,719,722 | 3/1973 | Tschoop | 203/81 |
| 3,761,361 | 9/1973 | Wall | 260/656 R |

Primary Examiner—Norman Yudkoff
Assistant Examiner—Frank Sever
Attorney, Agent, or Firm—Marn & Jangarathis

[57] ABSTRACT

Vinyl chloride is separated from a vinyl chloride feed which contains methyl chloride and at least one $C_4$ hydrocarbon. The feed is fractionally distilled in a first fractional distillation column to recover methyl chloride and vinyl chloride as overhead. The methyl chloride-vinyl chloride overhead is fractionally distilled in a second column to recover vinyl chloride as bottoms product. Monomer grade vinyl chloride in the order of 99.99% may be recovered.

5 Claims, 1 Drawing Figure

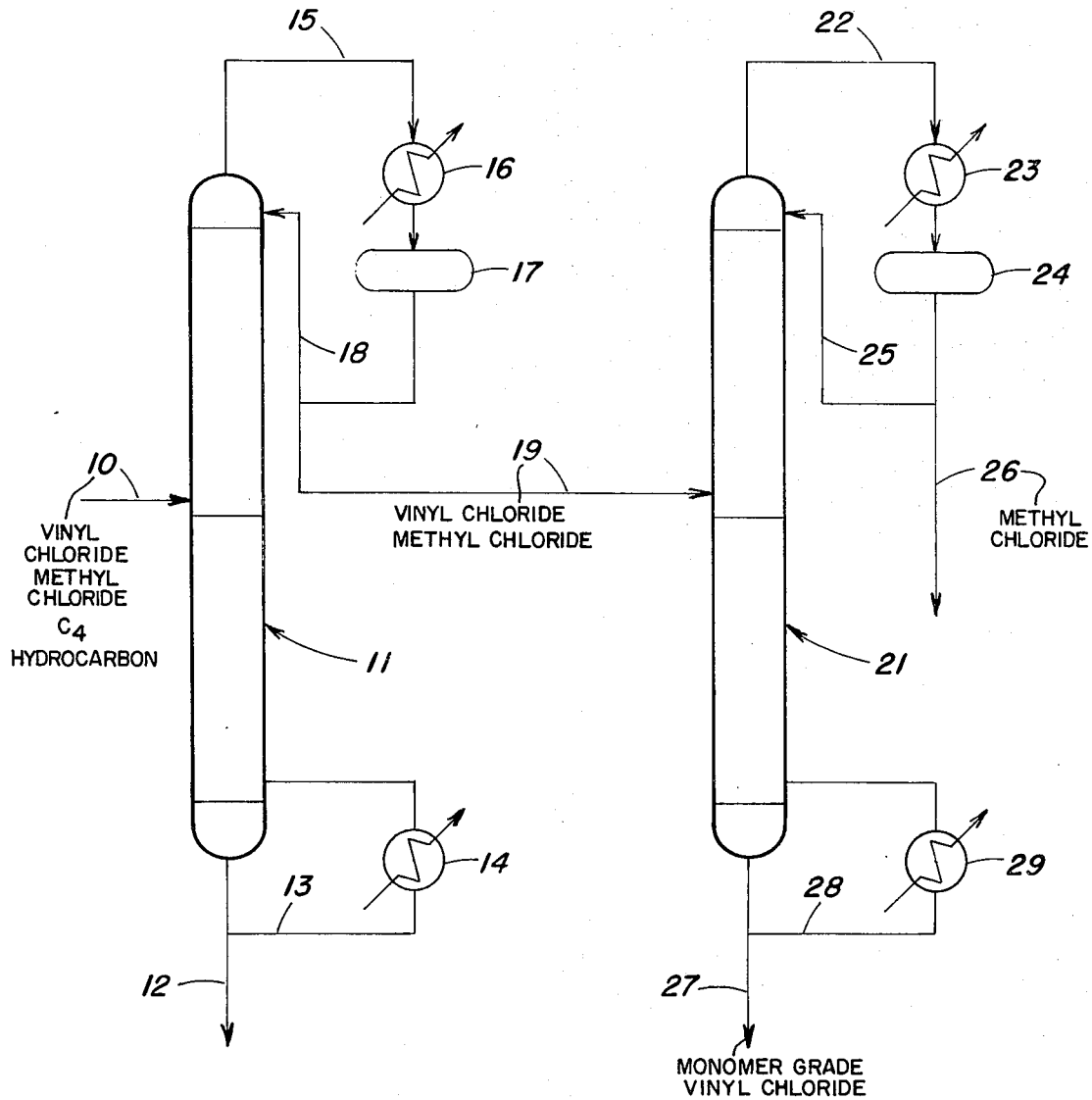

RECOVERY OF HIGH PURITY VINYL CHLORIDE BY DISTILLATION

This invention relates to the recovery of vinyl chloride, and more particularly to the recovery of monomer grade vinyl chloride from close boiling components.

Monomer grade vinyl chloride is required to be of high purity with commercial vinyl chloride monomer generally approximating 99.95 to 99.99% vinyl chloride.

In the production of vinyl chloride, the vinyl chloride product generally has to be further purified in order to provide monomer grade vinyl chloride. Thus, for example, in the production of vinyl chloride by the use of molten salts, as described in U.S. Patent application Ser. No. 153,374, filed on June 15, 1971 and Ser. No. 157,496, filed on June 28, 1971, the vinyl chloride product recovered in the separation and recovery system generally is comprised of from about 95 to about 99 mol. % vinyl chloride, with the remainder of the product being comprised of methyl chloride and $C_4$ hydrocarbons, including butene-1 and/or n-butane and/or butene-2 (cis-and/or trans-butene-2).

An object of the present invention is to provide for improved recovery of monomer grade vinyl chloride.

A further object of the present invention is to provide a new and improved process for recovering monomer grade vinyl chloride from a vinyl chloride feed stream containing, as impurities, methyl chloride and at least one $C_4$ hydrocarbon.

These and other objects of the invention should be more readily apparent from reading the following description of the invention with respect to the accompanying drawing wherein:

The drawing is a simplified schematic flow diagram of an embodiment of the process of the invention.

In accordance with the present invention, a vinyl chloride feed, containing, as impurities, methyl chloride and at least one $C_4$ aliphatic hydrocarbon; in particular, n-butane, and/or isobutane, and/or butene-1 and/or 2-butenes, and/or butadienes, is introduced into a first fractional distillation zone designed and operated to recover, as overhead, vinyl chloride and lighter components; in particular, methyl chloride. The components heavier than vinyl chloride are recovered as bottoms from the first fractional distillation zone. The overhead from the first fractional distillation zone is then introduced into a second fractional distillation zone designed and operated to recover, as bottoms, monomer grade vinyl chloride. The methyl chloride introduced with the feed to the second fractional distillation zone is recovered as overhead. The vinyl chloride bottoms recovered in the second fractional distillation zone is of monomer grade; i.e., the vinyl chloride bottoms is 99.9+% vinyl chloride.

The hereinabove described processing sequence for recovering monomer grade vinyl chloride is based, in part, upon Applicants' discovery that the presence of $C_4$ hydrocarbons in the vinyl chloride stream reduced the relative volatility between methyl chloride and vinyl chloride which made separation of methyl chloride and vinyl chloride quite difficult. Accordingly, in accordance with the present invention, the $C_4$ hydrocarbons are separated in the first fractional distillation zone, thereby facilitating the subsequent separation of methyl chloride and vinyl chloride.

In general, the feed stream to the first fractional distillation zone is comprised of at least about 95 mol. % vinyl chloride, and more particularly, from about 95 mol. % to about 99 mol. % vinyl chloride. The remaining components of the stream are methyl chloride and at least one $C_4$ hydrocarbon. The vinyl chloride feed stream may also include, as an impurity, ethyl chloride. In general, the first fractional distillation zone is operated at an overhead temperature from about 35° F. to about 293° F., a bottoms temperature from about 65° F. to about 300° F., and a column pressure from about 1.7 atmosphere to about 44 atmosphere (absolute). It is to be understood, however, that the above conditions are merely illustrative and do not limit the scope of the invention in that the design and operation of a fractional distillation column for effecting the disclosed separation is well within the scope of those skilled in the art.

The overhead recovered in the first fractional distillation zone which is comprised of vinyl chloride and methyl chloride and generally less than 500 parts per million of components heavier than vinyl chloride; i.e., ethyl chloride and/or $C_4$ hydrocarbon, preferably less than 65 parts per million of $C_4$ hydrocarbons, is introduced into a second fractional distillation zone to recover monomer grade vinyl chloride as a bottoms. The second fractional distillation zone is generally operated at an overhead temperature from about 12° F. to about 248° F., a bottoms temperature from about 52° F. to about 300° F, and a column pressure from about 1.7 atmosphere to about 45.5 atmosphere (absolute.) It is to be understood, however, that the above conditions are merely illustrative and do not limit the scope of the invention in that the design and operation of a fractional distillation column for effecting the disclosed separation is well within the scope of those skilled in the art.

The bottoms stream recovered from the second fractional distillation zone is monomer grade vinyl chloride; i.e., generally at least 99.95 mol. % vinyl chloride and preferably, in the order of 99.99 mol. % vinyl chloride. The bottoms product generally contains less than about 65 parts per million $C_4$ hydrocarbon and less than about 11 parts per million methyl chloride.

The invention will now be further described with reference to the accompanying drawing which is illustrative of a preferred embodiment of the present invention, but it is to be understood that the scope of the invention is not to be limited thereby.

Referring now to the drawing, a feed stream comprised of vinyl chloride and containing as impurities, methyl chloride and one or more of the following $C_4$ hydrocarbons: n-butane, isobutane, butene-1, cis- and trans-butene-2, and butadienes, and which may further contain, as an impurity, ethyl chloride, in line 10 is introduced into a fractional distillation column 11. As hereinabove described, the fractional distillation column 11 is designed and operated to recover, as overhead, vinyl chloride and lighter components. The fractional distillation column 11 is operated at temperatures and a pressure to recover vinyl chloride and lighter components, as overhead, and generally requires from about 150 to about 205 trays to effect the required separation.

A bottoms product comprised of the components heavier than vinyl chloride, which were present in the feed stream in line 10; in particular $C_4$ hydrocarbons and ethyl chloride, if present, which may also include minor amounts of vinyl chloride and methyl chloride, is withdrawn from column 11 through line 12, and a portion thereof passed through line 13, including heater 14, to meet the reboil requirements for column 11. An overhead product comprised of vinyl chloride and lighter components; in particular, methyl chloride which also may contain $C_4$ hydrocarbons in an amount less than about 65 parts per million, is withdrawn from column 11 through line 15, cooled in condenser 16 and collected in reflux drum 17. A portion of the condensed overhead from drum 17 is returned to the top of column 11 through line 18 to meet the reflux requirements therefor.

The condensed portion of the overhead not employed for meeting the reflux requirements for column 11, in line 19, is introduced through a second fractional distillation column, designated as 21, which is designed and operated to recover monomer grade vinyl chloride as a bottoms product. The fractional distillation column 21 is operated at the temperature and pressure conditions hereinabove described and is generally designed to include from about 85 to about 110 trays in order to effect the required separation.

An overhead comprised essentially of methyl chloride is withdrawn from column 21 through line 22, cooled in condenser 23 and collected in reflux drum 24. A portion of the condensed overhead, collected in drum 24, is returned to the top of column 21 through line 25 to meet the reflux requirements therefor, and the remaining portion is recovered in line 26, as net overhead product.

A bottoms product of monomer grade vinyl chloride; i.e., containing at least 99.95 mol. % vinyl chloride, and preferably in the order of 99.99+mol. % vinyl chloride, and containing less than about 11 parts per million of methyl chloride and less than about 65 parts per million of $C_4$ hydrocarbons, is withdrawn from column 21 through line 27, and a portion thereof passed through line 28 including heater 29 to meet the reboil requirements for column 21.

The following example further illustrates the present invention but it is to be understood that the scope of the invention is not to be limited thereby.

TABLE

Monomer grade vinyl chloride is recovered as reported in the following Tables:

|  | Tower 11 | Tower 21 |
|---|---|---|
| Number of Plates | 185* | 100* |
| Feed plate (from top) | 85 | 48 |
| Reflux Ratio | 7.6 | 240 |
| TOP |  |  |
| Temperature, °F. | 145 | 125 |
| Pressure, Psig. | 132 | 151 |
| BOTTOM |  |  |
| Temperature, °F. | 160 | 160 |
| Pressure, Psig. | 147 | 161 |

*65–80% tray efficiency

The teachings of the present invention are particularly applicable for purifying to monomer grade vinyl chloride, the vinyl chloride obtained as reaction product from the chlorination of ethane and/or ethylene by the use of molten salts, as described in the aforementioned U.S. patent application Ser. Nos. 153,374 and 157,496, which are hereby incorporated by reference. In such a process, the vinyl chloride product employed as feed in the present invention generally includes as impurities, methyl chloride, n-butane, butene-1, cis- and trans-butene-2 and ethyl chloride.

The present invention is particularly advantageous in that the difficulties associated with separating vinyl chloride, in monomer grade, from the close boiling methyl chloride and $C_4$ hydrocarbon impurities are essentially eliminated. In particular, by separating the $C_4$ hydrocarbon, prior to effecting the splitting of vinyl chloride and methyl chloride, the relative volatility of vinyl chloride with respect to methyl chloride is a value such that the separation may be easily effected.

Numerous modifications and variations of the present invention are possible in light of the above teachings and, therefore, within the scope of the appended claims the invention may be practised otherwise than as particularly described.

What is claimed is:

1. A process for recovering monomer grade vinyl chloride, comprising:
   a. introducing a mixture comprising 95 to 99 mole % vinyl chloride and as impurities, methyl chloride and at least one $C_4$ aliphatic hydrocarbon into a first fractional distillation zone designed and operated to recover vinyl chloride and lighter components as overhead, containing less than 500 ppm of components boiling higher than vinyl chloride;
   b. recovering the overhead from the first fractional distillation and introducing same into a second fractional distillation zone designed and operated to recover monomer grade vinyl chloride as bottoms; and
   c. recovering a monomer grade vinyl chloride bottoms containing at least 99.95 mole % vinyl chloride from said second fractional distillation zone.

2. The process of claim 1 wherein the first fractional distillation zone is operated at an overhead temperature from about 35° F. to about 293° F., a bottoms temperature from about 65° F to about 300° F. and a column pressure from about 1.7 atmosphere to about 44 atmosphere, absolute.

3. The process of claim 2 wherein the second fractional distillation zone is operated at an overhead temperature from about 12° F to about 248° F., a bottoms temperature from about 52° F. to about 300° F., and a column pressure from about 1.7 atmospheres to about 45.5 atmospheres, absolute.

FLOW RATES

| | STREAM | | | | | | | | | | MW |
|---|---|---|---|---|---|---|---|---|---|---|---|
| | 10 | | 12 | | 19 | | 26 | | 27 | | |
| | lb-mol hr | lb hr | lb-mol hr | lb hr | lb-mol hr | lb hr | lb-mol hr | lb hr | lb-mol hr | lb hr | |
| COMPONENT | | | | | | | | | | | |
| Methyl Chloride | 10.3 | 520 | .041 | 2.1 | 10.3 | 520 | 10.3 | 520 | .011 | .56 | 50.49 |
| Vinyl Chloride | 1006.0 | 62875 | 4.0 | 250 | 1002.0 | 62625 | 2.0 | 125 | 1000.0 | 62500 | 62.50 |
| 1-Butene | 3.8 | 213 | 3.8 | 213 | .013 | .73 | | | .013 | .73 | 56.104 |
| n-Butane | 3.7 | 215 | 3.7 | 215 | .050 | 2.9 | | | .050 | 2.9 | 58.12 |
| trans-2-Butene | 1.6 | 90 | 1.6 | 90 | | | | | | | 56.104 |
| cis-2-Butene | 0.7 | 39 | 0.7 | 39 | .001 | .06 | | | .001 | .06 | 56.104 |
| Ethyl Chloride | 1.0 | 65 | 1.0 | 65 | | | | | | | 64.52 |
| TOTAL | 1027.1 | 64016 | 14.841 | 874.1 | 1012.364 | 63148.69 | 12.3 | 645 | 1000.075 | 62504.25 | |

4. The process of claim 3 wherein the monomer grade vinyl chloride recovered as bottoms from the second fractional distillation zone contains at least 99.99 mole % vinyl chloride.

5. The process of claim 3 wherein the monomer grade vinyl chloride recovered as bottoms from the second fractional distillation zone contains less than about 65 part per million of $C_4$ hydrocarbons and less than about 11 part per million of methyl chloride.

* * * * *